United States Patent [19]

Thomson et al.

[11] 4,273,506
[45] Jun. 16, 1981

[54] INDUSTRIAL MANIPULATOR FOR PLACING ARTICLES IN CLOSE PROXIMITY TO ADJACENT ARTICLES

[75] Inventors: Robert P. Thomson, Nottingham; James R. Robertson, Runcorn, both of England

[73] Assignee: Imperial Chemical Industries Limited, London, England

[21] Appl. No.: 948,790

[22] Filed: Oct. 5, 1978

[30] Foreign Application Priority Data

Oct. 20, 1977 [GB] United Kingdom ............... 43709/77
Dec. 23, 1977 [GB] United Kingdom ............... 53748/77

[51] Int. Cl.³ .............................................. B66C 1/32
[52] U.S. Cl. ...................................... 414/735; 294/88; 294/106; 414/739; 414/744 A
[58] Field of Search ............... 414/732, 735, 738, 739, 414/744 A, 744 B, 744 C, 909, 1; 294/88, 103, 106

[56] References Cited

U.S. PATENT DOCUMENTS

| 2,605,919 | 8/1952 | Shattuck | 414/739 |
| 3,056,625 | 10/1962 | Timmerman | 294/88 X |
| 3,255,893 | 6/1966 | Hainer et al. | 414/732 X |
| 3,460,329 | 8/1969 | Overstreet, Jr. | 294/88 X |
| 4,076,131 | 2/1978 | Dahlstrom et al. | 414/735 X |
| 4,132,318 | 1/1979 | Wang et al. | 414/739 X |

FOREIGN PATENT DOCUMENTS

993772 6/1965 United Kingdom ...................... 294/88

Primary Examiner—Leslie J. Paperner
Assistant Examiner—Edmond G. Rishell, Jr.
Attorney, Agent, or Firm—Cushman, Darby & Cushman

[57] ABSTRACT

A method of placing an article onto a surface in close proximity to an adjacent previously-placed article, comprises gripping the article between a pair of jaws, tilting it away from the previously-placed article about an axis parallel to the surface and thereafter releasing it by opening the jaws, the tilt being sufficient to bring the lowered side of the gripped article close to the surface, with the elevated jaw remaining sufficiently high to clear the previously-placed article as it opens. A manipulator suitable for carrying out this method comprises, a gripper having a pair of jaws, a supporting structure for positioning the gripper and an orientation zone interconnecting the gripper and supporting structure for orientating the gripper, the orientation zone comprising means for tilting the gripper about a first axis and means for rotating the gripper about a second axis wherein the tilting means lie between the gripper and the rotation means and the axis of tilt is perpendicular to the axis of rotation, the orientation zone being connected to the supporting structure by a joint which enables the first axis to be held parallel to the surface when the gripper is tilted.

7 Claims, 5 Drawing Figures

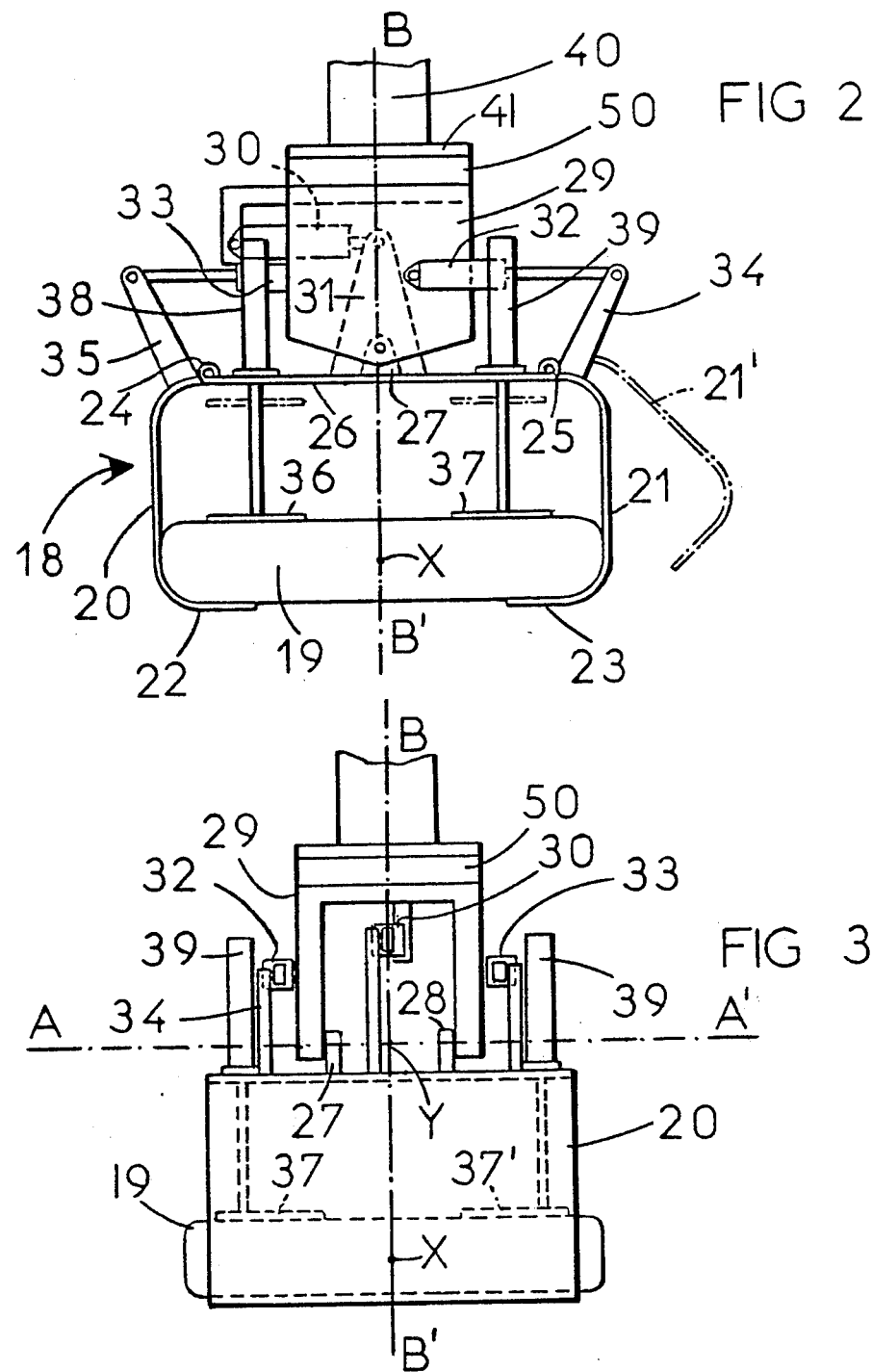

INDUSTRIAL MANIPULATOR FOR PLACING ARTICLES IN CLOSE PROXIMITY TO ADJACENT ARTICLES

BACKGROUND OF THE INVENTION

This invention relates to an industrial manipulator device and in particular to an operational element thereof. An operational element may comprise a functional zone for example a claw or hand mechanism suitable for use in transporting articles and the operational use with which this invention is particularly concerned, is the stacking of articles in close proximity to adjacent articles, hereinafter referred to as "close-packing".

The term "industrial manipulator" is used to describe a robot-like machine capable of moving an "operational element" to a location on a space grid, the movement is determined by commands received by the industrial manipulator and translated into controlled movements imparted to the operational element for example by powered joints. For example the commands may come from an operator e.g. via a manual control lever or from an electronic keyboard or they may come from a memory unit.

Such industrial manipulators will in general be capable of positioning any defined point of the operational element (e.g. a functional extremity) or of the articles carried thereby at any desired point on a three-dimensional space grid. This positioning operation requires three degrees of freedom for movements along or in three mutually perpendicular axes or planes irrespective of how these movements are obtained e.g. either circularly or linearly. In additional industrial manipulators are known which impart to the operational element a rotational movement about one of the axes or planes of the space grid so that having positioned the operational element and any article carried thereby, the operational element and article may together be rotated about one of the axes on the space grid in order to orientate the article for locating it into a shaped slot, bed or other receiver. The term "orientation" is used to describe the rotation of the operational element about one of the mutually perpendicular space grid axes and constitutes an additional degree of freedom in industrial manipulators provided that the orientation is effected independently of the three positional movements used to locate the operational element in the space grid.

The "functional zone" of the operational element may include a cutting tool, assembly tool, gripper, load-supporting platform, welding electrode, paint spray or other component well known in the production engineering art and the method of support control or mechanical attachment to the operation element.

A problem has been observed in the use of such conventional industrial manipulator devices and operational elements thereof using a gripper as the functional zone for the picking up and close-packing of articles, for example—the picking up and stacking of bags or sacks filled with powder or granular material onto a pallet (hereinafter called "Palletization"). For simplicity palletization is considered to be in one plane of the space grid, most conveniently the horizontal plane. Articles, after picking up, can be positioned and orientated by four degrees of freedom (three positions in grid space and orientation by a rotary movement in the plane of the pallet). This locates each one on a pallet but when this is done, the thickness of the gripper fingers prevents the close-packing operations being performed exactly and gently, especially if the gripper has curved fingers, as many do have in order to give a better grip. In known palletization, the articles are often positioned fairly closely and dropped or otherwise propelled (e.g. from an expulsion piston in the claw) into location as the gripper opens to release the article but these procedures have disadvantages because the article may not withstand the rough treatment.

We have now found that an operational element having an additional movement may be made such that either a minimum of five degrees of freedom (i.e. three positional motions and two orientational motions all independent of each other) or four degrees of freedom (i.e. three positional motions and one orientational motion all independent of each other) together with a fifth motion which combines independent rotation with a separately-controlled but consequential positional motion is essential to provide adequate control of the operational element (or the functional zone) for some delicate operations to be performed. This novel device on an industrial manipulator when the functional zone is a gripper enables palletization to be performed gently and with precision even when curved fingers to the gripper would prevent the effective use of a device having only four degrees of freedom.

SUMMARY OF THE INVENTION

According to the present invention we provide an industrial manipulator capable of imparting movements to an operational element thereof, movements resulting in at least four degrees of freedom namely three positional degrees and one orientational degree accomplished by a rotary movement, the operational element comprising means to provide an arcuate movement of the functional zone thereof, the arcuate movement being on a circular arc centred on an axis which is perpendicular to the axis of the said rotary movement imparted to the operational element.

It will be appreciated that the two axes which are mutually perpendicular may or may not be coincident i.e. they may or may not intersect at a point. If they do not intersect there will always be a displacement of the positioning of the functional zone as the arcuate movement takes place which will require correction by repositioning from the industrial manipulator. If they intersect, displacement may or may not occur depending on where the point of intersection is in relation to the mid-point of the article.

To aid understanding, if we consider the industrial manipulator to be a gantry positioning system providing three translational degrees of freedom by means of linear movements in three mutually perpendicular axes a given point X in an article suspended thereby may be translated and positioned to any point on the space grid. Some orientation of the article about an axis of the space grid using X as center will precisely locate the article without any readjustment of the position of X. If X is not used as the center of the orientation an adjustment of the position of X is now possibly needed to ensure orientation of the extremities of the article directly in line with the final location desired.

Of course, the four degrees of freedom imparted to the operational element by the industrial manipulator may not be from a gantry-type system. It is more common for industrial manipulators to provide arcuate jointed movements by means of components which may be considered as arms, elbows, wrists, etc. However the fundamental positional and orientation movements on the space grid are not affected thereby, they are merely achieved in a different way.

We prefer the operational element of the industrial manipulator to provide such a movement of the functional zone that it constitutes a true fifth degree of freedom. Therefore a preferred operational element of an industrial manipulator according to the invention comprises means to provide an arcuate movement of the functional zone independently of any of the movements involved in the four degrees of freedom imparted thereto. This may be done if the arcuate movement is centred on an axis which passes through the centre of the functional zone or alternatively through a point X chosen as the point on an article which is located precisely on the space-grid adopted by the manipulator.

According to another aspect of the present invention, we provide a method of close-packing of articles on a planar surface (for example the palletization of sacks) comprising the picking up, transportation and location of the article by means of a gripper device of an industrial manipulator, the method further comprising subsequent to the location and orientation of the article in a plane parallel to the said surface, the tilting of the article about an axis parallel to the plane of the surface in order to bring one side only of the article close to the surface before releasing the article from the gripper.

We have found that by using the above method in the palletization of bags or sacks the disadvantages of prior art methods are overcome. As the sack is tilted down one side towards the adjacent sack resting on the pallet, the jaws of the gripper may be released when the two sacks achieve close proximity without damage to either sack.

If the article has non-rigid geometry the jaws of the gripper must be curved to give support to the outsides and underside of the article. Close-packing of second and subsequent articles are best achieved by use of this method, otherwise part of the jaws will be trapped by any adjacent article. Dropping the article or propelling it from such a pre-location has disadvantages in that the sacks may be ruptured and also both jaws may not open simultaneously causing the sack to be twisted away from the correct orientation.

Close-packing onto a horizontal surface with gentle handling is obtained by rotating the article about an axis in a horizontal plane such that the underside is now inclined to the horizontal loading surface but not twisted with respect to the locating plane. The prospective jaw-trapping edge is uppermost at a height sufficient for the jaw to clear an adjacent packed article when it is released. The lower jaw is not obstructed by an adjacent article and can be moved very close to the surface, e.g. the pallet with sufficient clearance for release of the gripper. When the upper jaw is released, the bottom jaw acts as a horizontal hinge for the upper side to rock into a close-packing location adjacent other articles. The lower jaw is now released to complete the final location.

BRIEF DESCRIPTION OF THE DRAWINGS

FIG. 2 shows a front view of one embodiment of a gripper mechanism;

FIG. 3 shows a side view of the FIG. 2 gripper mechanism;

DETAILED DESCRIPTION

Figure 1:
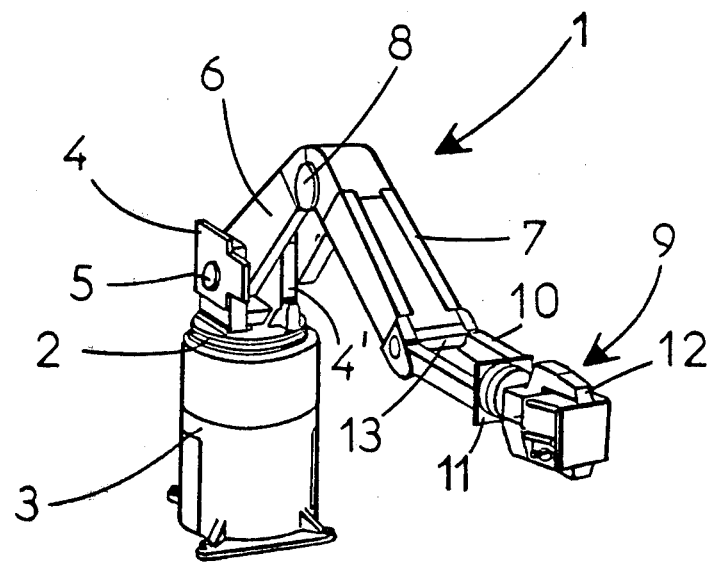
FIG. 1 shows a preferred embodiment of a manipulator arm arrangement.

Many industrial manipulators are known having a variety of different modes of operation and having differing degrees of freedom of movement.

We have now found that an industrial manipulator of the type described hereinbefore may be modified quite simply into a device falling within the statement of invention contained in this present application.

According to an aspect of the present invention we provide in an industrial manipulator having a swinging arm comprising at least two rigid portions jointed together and to a fixed base so as to allow movement of the arm in a single plane, that plane being capable of orientation by a rotary movement of the arm from a turntable on the base, the arm terminating in an operational element which includes means capable of imparting two movements to a functional zone of the manipulator, (1) a controlled rotary movement about an orientational axis capable of being positioned by the arms and
(2) a circularly arcuate tilting movement about an axis which is perpendicular to the said orientational axis,
the operational element being characterised in that the said means imparting two movements are placed in the operational element in the numerical order stated from the arm towards the functional zone so that movement (1) takes precedence over movement (2).

The "functional zone" may include a cutting tool, assembly tool, gripper, load-supporting platform, welding electrode, paint spray or other component well known in the production engineering art and the method of support control or mechanical attachment to the rest of the manipulator.

It may be seen that in the prior-art manipulator described hereinbefore movements are incorporated similar to those provided for the improvement means which are the feature of this invention.

However in the prior-art the placement of the two movements in proximity to the functional zone are in the reverse order, the tilting movement being further from, and the rotary movement about the orientational axis being nearer to, the functional zone. It is the ordered placement of these movements that gives the advantage to this invention in that two extra true degrees of freedom are imparted to the manipulator (in particular to the functional zone thereof) by these two movements when placed in the required order. It may be said that the rotary movement "precedes" or "takes precedence over" the tilting movement in the order of placement relative to the static (or fixed) end and the functional (or movable) end of the manipulator. The "precedence" of the rotary movement over the tilting movement in the manipulator disclosed in the present invention, implies that the axis for the tilting movement may be oriented into any direction desired, thus considerably increasing the versatility of this movement and its effect on the functional zone, which in the prior art was limited by the plane of the movement of the arms even though a rotary movement was placed adjacent to the functional zone. Therefore it may be seen that not only are the actual movements important in the operation of manipulators but the "precedence" of one movement over another will affect the ability of the manipulator to perform certain tasks. It should be emphasised that this "precedence" is seen in the physical placement of components in the manipulator and not seen in the sequence-in-time of the various movements which the manipulator may perform in order to position and orientate the functional zone. The movements may be performed in any time-order desired without affecting the number of degrees of freedom of the device.

An embodiment of the present invention is illustrated by the diagram in FIG. 1 and the operational elements each of which may be incorporated therein, are shown in FIGS. 2, 3, 4 and 5.

Referring to FIG. 1, base block 3 bolted to the floor or wall carries a turntable 2 on which is mounted parallel plates 4, 4'. An arm 6 is mounted between the plates on an axle 5. Arms 6 and 7 are hinged by axle 8 to provide controlled movements in a vertical plane parallel to the plane of plates 4, 4'. Arms 26, 27 are hinged by axle 13 in order to provide further controlled movements in the same vertical plane, the orientation of which is determined by and is parallel to plates 4, 4' on turntable 2. On the end of arm 10 a rotatable plate 11 joins the operational element 9 to the rest of the manipulator. The operational element 9 may be positioned in any desired location by movements of the arms 6, 7 and 10 and of the turntable 2 and then orientated about any desired axis by the rotatable plate 11, which in a preferred form is a plate giving a controlled rotation of 360°. By these movements four degrees of freedom are imparted to the operational element which itself now incorporates the functional zone and in our invention provides by virtue of its own tilting mechanism the fifth degree of freedom to the functional zone. FIGS. 2, 3, 4 and 5 show two gripper mechanisms, respectively, which are preferred embodiments of an operational element in which this fifth degree of freedom is achieved by providing tilting movements about an axis perpendicular to that orientational axis provided by the rotatable plate 11.

Preferred embodiments of the operational elements are shown by reference to FIGS. 2 and 3 in which front and side views, respectively, are shown of a gripper mechanism.

The gripper mechanism 18 is carried by a mounting plate 41, which is attached to or is a constituent part of the arm 40 of an industrial manipulator device sometimes referred to as "a robot arm" not shown in FIGS. 2 and 3. The industrial manipulator, or robot, is inherently capable of positioning the gripper mechanism on a three dimensional space grid and also of imparting a rotational movement to it about the axis B . . . $B^1$, thus the mounting plate 41, and hence, the whole gripper mechanism 18 shown carried by mounting plate 41 possesses four degrees of freedom.

The gripper mechanism 18 consists of jaws 20, 21 each hinged at 24, 25 on opposite ends of a chassis plate 26. Brackets 27, 28 attached to the chassis plate 26 are pivotally connected to the flanks of a supporting column 29. The pivoted movement of the chassis plate 26 is controlled by a piston 30 bearing on a control strut 31 rigidly connected to chassis plate 26.

The opening of the jaws (for example to position 21') is controlled by pistons 32, 33 each of which operate independently to each respective jaw 20, 21 by cranks 34, 35. For convenience, one crank and one piston is located to the front of the gripper mechanism and the other pair to the rear as shown in the side view of FIG. 3. Compacting plates 16, 17 resiliently biassed towards the article 19 held by the jaws and may be automatically adjusted in columns 38, 39 by means of either springs or pistons.

A load sensor 50 is shown located between mounting plate 41 and column 29 which is used to record either the load carried by the gripper mechanism 18 or any reaction force sensed on the outside of the jaws 20, 21. Sensor 50 is an optional feature and does not affect the orientation, positioning or operation of the gripper mechanism 18.

In operation the gripper mechanism 18 carrying the article 19 is positioned by the industrial manipulator 1 and moved into position along axis BB'. As it nears the correct location the chassis plate 26 is tilted by means of piston 30, for example, such that jaw 20 moves towards $B^1$ so that jaw 20 and one side 22 of the article 19 may be moved nearer to the final location. Jaw 21 is opened to position 21' and the other side 23 of article 19 is allowed to rock into the predetermined location giving a close-fit to adjacent articles. After article 19 rocks into location, jaw 20 is opened. There is, thus, sufficient clearance from either other articles or the final location surface to allow jaw 20 to be freed and the side 22 of article 19 to nestle into the final location. The whole gripper mechanism 18 may then be withdrawn along BB' and any tilt corrected prior to picking up another article.

The tilt of the chassis plate is operated about the pivots of brackets 27, 28 whereas if article 19 is to be pivoted without any lateral displacement away from the axis BB', ideally it should be pivoted about the point X. The lateral displacement which occurs in this operation is corrected by continuous adjustment of the position of point X from the manipulator arm.

Figure 4:
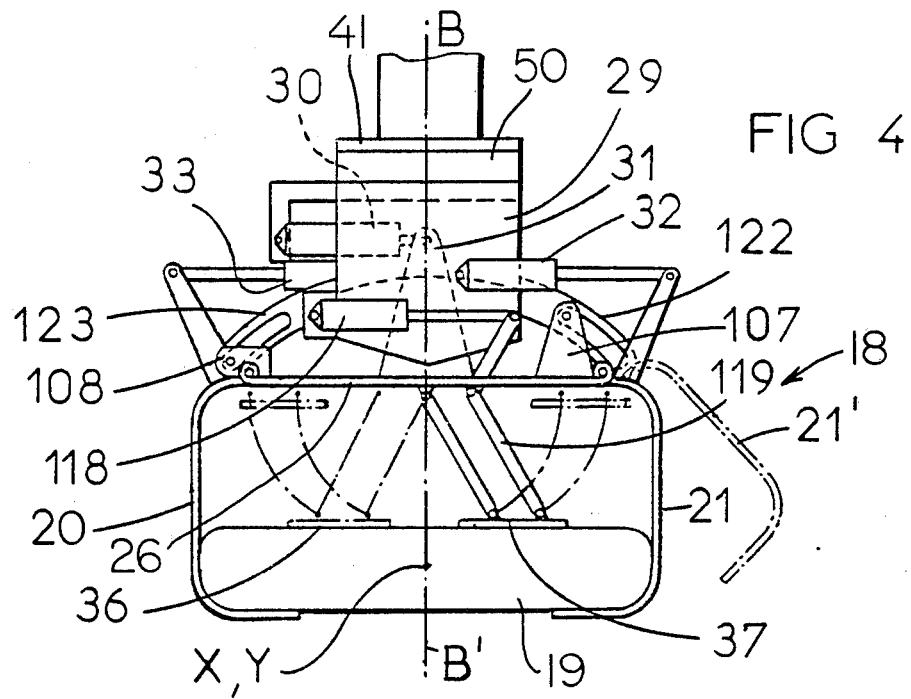
FIG. 4 shows a front view of another embodiment of a gripper mechanism.
Figure 5:
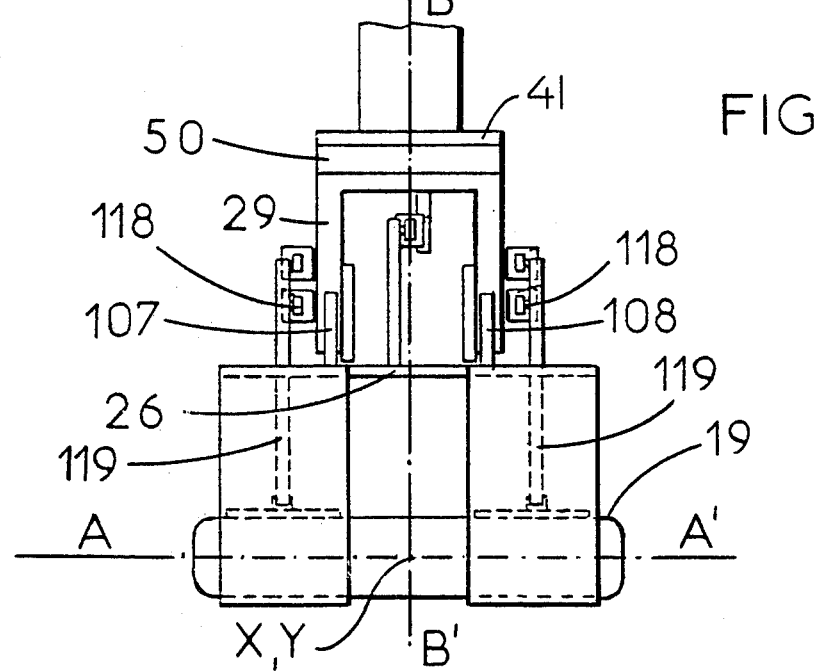
FIG. 5 shows a side view of the FIG. 4 gripper mechanism.

In an especially preferred embodiment shown in FIGS. 4 and 5 this disadvantage is overcome and arcuate movement of the chassis plate 26 about the point X is made possible. Many components are common to both embodiments in FIGS. 2, 3, 4 and 5, for example, the mounting plate 41, column 29, piston 30, control strut 31, and jaws 20, 21, respectively, operated from pistons 32, 33 and cranks 34, 35, respectively.

In the embodiment of FIGS. 4 and 5 the chassis plate 26 is suspended by means of brackets 107, 108 which slide in arcuate webs 122, 123 supported on the flanks of column 29. The arcuate webs 122, 123 are centred on the point X, Y and clockwise rotary movement of the chassis plate 26 about this point is controlled by the operation of piston 30 bearing on control strut 31.

In this embodiment compaction plates 36, 37 are controlled from piston 118 via cranks 119 in order to hold the article 19 in place in jaws 20, 21.

The jaws 20, 21 may each be split into two parts as shown in the FIG. 5 side view, the parts of each jaw being rigidly coupled so that they still operate as one jaw. It is sometimes advantageous to be able to adjust the gap between the parts so that variable length articles may be accommodated. Such a design of gripper mechanism 18 gives added support to articles carried, especially floppy articles such as sacks or bags filled with particulate matter, powders, granules etc. which this invention is especially suitable for handling. The claw further restrains any uncontrolled motion when the gripper mechanism 18 is subjected to acceleration from the industrial manipulator 1, especially when the article is held tightly therein by the compaction plates 36, 37 which ensure reproducibility in the physical geometry of the article.

We claim:

1. An industrial manipulator for placing articles onto a surface in close proximity to adjacent articles, comprising:
   a gripper having a pair of jaws for gripping an article;
   support means for positioning the gripper in space;
   orientation means for interconnecting the gripper and the support means for orientating the gripper, said orientation means comprising: means for tilting the gripper about a first axis; and means for rotating the gripper about a second axis perpendicular to said first axis, said first and second axis mutually intersecting at a common point located between said jaws, said rotating means being located on the opposite side of said tilting means as the gripper; and
   joint means for interconnecting said orientation means to said support means so that said first axis is held parallel to the surface onto which articles are to be placed when the gripper is tilted.

2. An industrial manipulator as claimed in claim 1 in which the extended ends of the jaws are angled inwards so as to provide platforms for supporting a gripped article from below, over at least part of the area of said article, the gripper being provided with means for biasing said gripped article against said platforms.

3. An industrial manipulator as claimed in claims 1, or 2 in which the jaws are independently operable.

4. An industrial manipulator as claimed in claim 1, wherein the common point coincides with the midpoint of the article.

5. An industrial manipulator as claimed in claims 1, or 2 wherein said joint means connecting said orientation means to said support means comprises a movable joint.

6. An industrial manipulator as claimed in claim 5 in which the support means is a swinging arm comprising at least two rigid portions movably jointed together and to a rotatable base, the orientation means being located at the end of the arm remote from the base.

7. An industrial manipulator as claimed in claims 1, or 2 which incorporates load sensing means for sensing one of the load carried by the gripper, or a reaction force on the outside of the jaws.

* * * * *